Feb. 24, 1959    R. L. WANN    2,874,745
TUBELESS TIRE

Filed Jan. 4, 1954    2 Sheets-Sheet 1

INVENTOR.
RICHARD L. WANN
BY
W. A. Fraser
ATTY

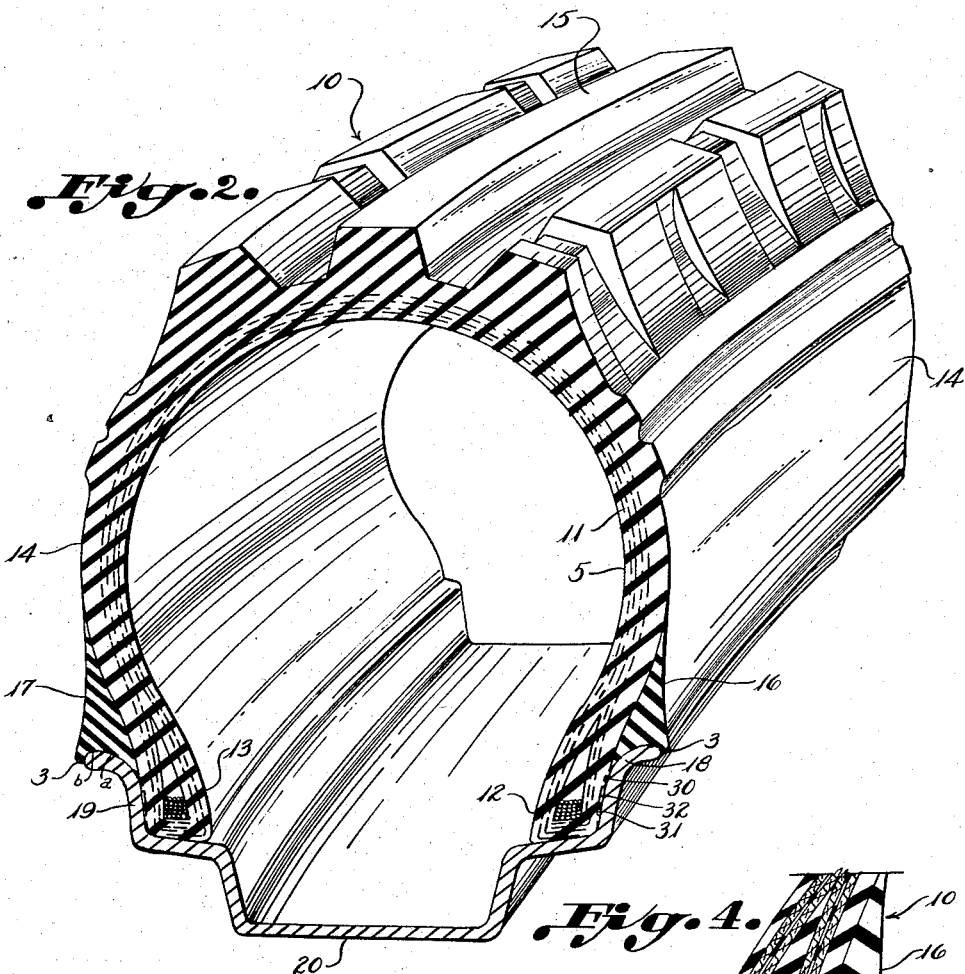
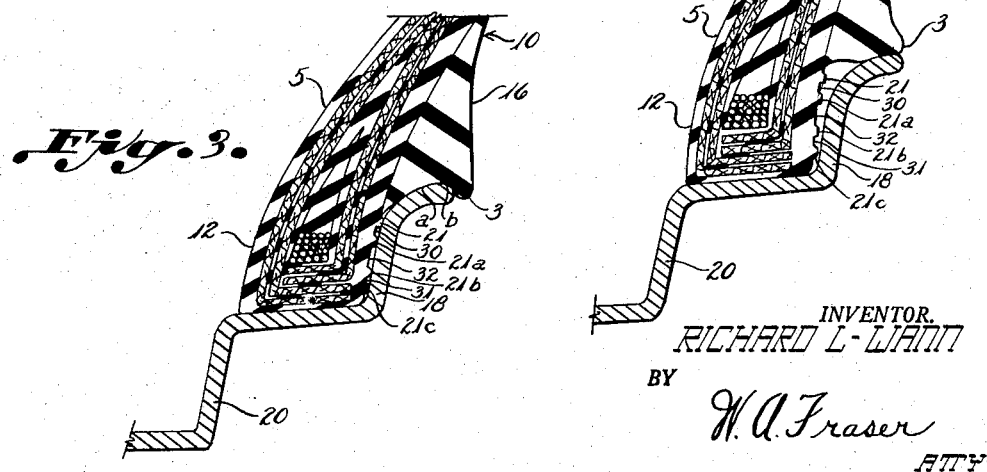

United States Patent Office 2,874,745
Patented Feb. 24, 1959

2,874,745
TUBELESS TIRE

Richard L. Wann, Cuyahoga Falls, Ohio, assignor to The Firestone Tire & Rubber Company, Akron, Ohio, a corporation of Ohio Application January 4, 1954, Serial No. 401,776

2 Claims. (Cl. 152—353)

This invention relates to agricultural tractor tires of the tubeless open-beaded pneumatic type and has as one of its principal objects the prevention of the entrance and lodging of foreign material between the beads of a tire and the tire rim flange.

Another object of the present invention is to provide recesses in the tire rim flange contact surface of agricultural tractor tire beads, which recesses are adapted to receive and retain a limited amount of silt or soil.

The Tire and Rim Association, Inc., an organization that publicizes standards adopted by the tire industry in the United States of America, recommends low inflation for agricultural tractor tires. For example, said association's present standard for 4 ply 6.00–16 tires for front wheels is 28 pounds inflation and for 4 ply 11.00 tires for rear wheels 12 pounds. Agricultural tractors are frequently used for plowing and when so used, the tires are subjected to extreme side thrust or pressure against the tires. The rear tires are often crowded forcibly against the side of a furrow and when the tractor is turned sharply as at the end of a furrow the tractor is substantially pivoted on one of the rear tires which tends to twist one side of the pivoting tire from its contact with the tire rim side flange. Also when the tractor is being turned as just described, the front wheels are turned at substantially a right angle to the center line of the tractor which results in the sides of these front tires being pressed sidewise forcibly against the soil.

As soil adapted for cultivation by plowing is soft and frequently includes straw, corn stalks, cover-crops and the like, tractor tires sink into such soil to such an extent as to expose the tire beads to the soil. When the soil is very soft, it is not unusual for farmers to violate the recommended inflation pressure by reducing low inflation pressure still further to obtain greater flotation which practice exaggerates the ease with which the sides of a tire, adjacent the tire rim flange, may be forced away from such flange. Whether or not the said inflationary pressure is reduced below the recommended standards, the side pressure exerted on the tires, as described above, frequently pushed the beads of the tires away from the rim flanges a sufficient distance to permit soil and the fibrous material and small sticks therein to enter and lodge between the tire beads and the rim flanges. Heretofore, it has been the common practice to use inner tubes in tractor tires and this lodgment of foreign material, as described above, while not desirable, was not fatal to the service of the tire since the inflationary air of the tire was retained in the inner tube.

The present invention provides a tubeless tire for agricultural farm tires and applicant was confronted with the fact that foreign material lodged between a tire bead and the tire rim side flange destroyed the air seal which was necessary between said beads and flanges. As indicated above, such air seal was effected by the rubber on the tire beads being pressed into contact with tire rim flanges by the inflationary pressure within the tire. The present invention provides means whereby sticks, fibrous and coarse types of said foreign material is prevented from entering the space between the said tire beads and flanges when the tire sidewalls adjacent the tire beads are forced away from said flanges and further provides means for receiving a limited amount of silt and similar types of soil which may gradually enter between the tire beads and said flanges whereby the said rubber contact with said flanges is not prevented by such limited amounts of silt and soil.

These and other objects of the invention will be apparent from the following description reference being had to the drawings, in which:

Fig. 2 is a fragmentary perspective view of the tire of Fig. 1 shown partly in section and mounted on a tire rim, the tire inflated and the tire beads in fluid tight contact with the side flanges of said rim;

Figure 1:
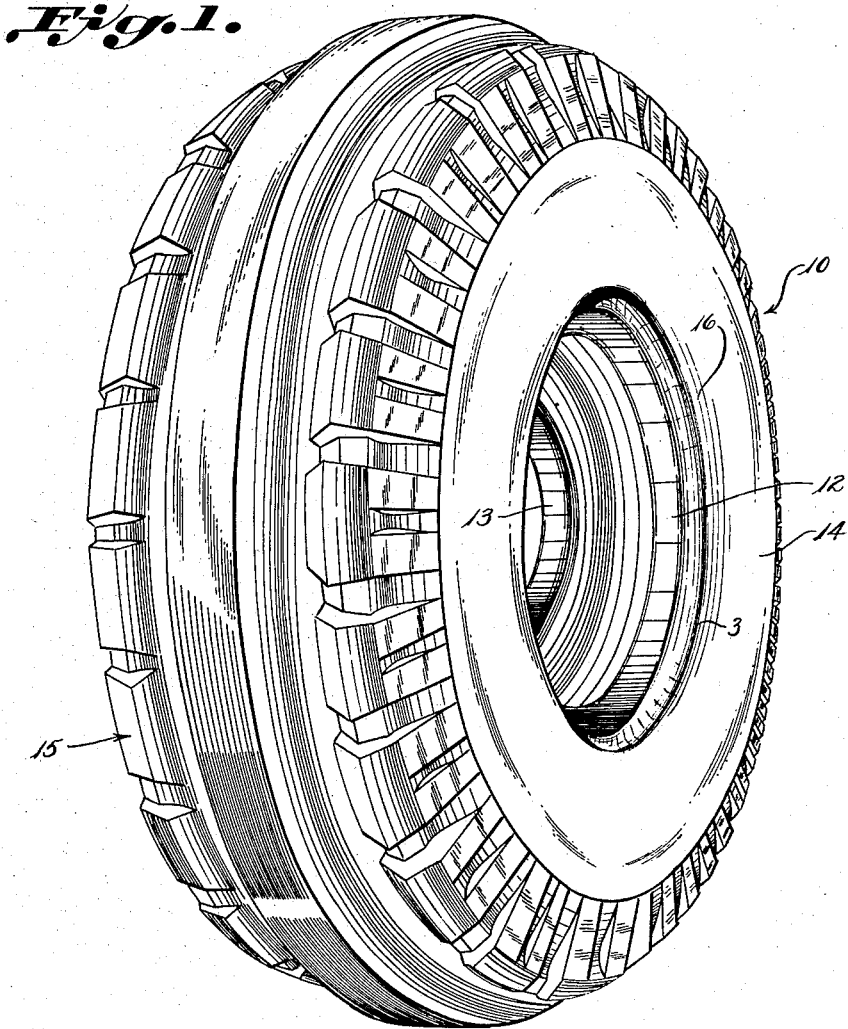
Fig. 1 is a perspective view of a tire embodying the present invention.

Fig. 3 is an enlarged fragmentary sectional view of Fig. 2 taken at the tire bead and adjacent rim portion and illustrating the relative position of the tire bead and rim tire bead flange when the tire is running in service with the tire bead in normal contact with the tire rim; and Fig. 4 is a view similar to Fig. 3 except it illustrates the relative position of the tire bead and rim tire bead flange when the side of the tire has been forced a distance away from said rim flange.

Referring to the drawings in detail and particularly to Fig. 2, it will be seen that tire 10 comprises a body portion 11 consisting of four plies of rubberized fabric which may be of any kind found satisfactory such as cord, rayon, nylon, wire, etc. Said tire also comprises the usual inextensible bead portions 12 and 13, sidewalls 14, lining 5 and tread portion 15. The sidewall 14 includes thickened portions 16 and 17 and the lateral outer surface of beads 12 and 13 are formed with recesses 30, 31 and 32. It is to be noted that these recesses are of substantial depth and preferably they form concentric endless grooves about the rim flange contact surface of said tire beads. It is to be understood that while the recesses in the form of endless concentric grooves preferably extend circumferentially entirely around the bead portions of the tire, the invention is not to be limited to specific shapes of the recesses since they may be of any form found satisfactory to receive and retain silt or the like that may enter between the tire beads and the tire rim side flange.

In order to make tire 10 impervious to the inflationary air that comes into direct contact with its inside surface, it is provided with a lining 5 which may be composed of a butyl type rubber. Rim 20 is provided with a tire inner tube valve and stem, not shown, which stem is in fluid tight relation with said rim and provides means for inflating tire 10 in the manner well known in the tubeless tire art. An air tight seal between the tire 10 and rim 20 is effected by the pressure of the internal air of the tire forcing the lateral outer surface of the tire beads 12 and 13 against the rim flanges 18 and 19 respectively. The initial inflation of said tire on said rim may be conveniently done by first placing the tire over the drop center rim 20 in the usual way, and then in order to force the beads apart onto the bead seats provided on the rim, a band is placed around the center of the tread of the tire and contracted to shorten the circumference of the tread of the tire and thus force the beads apart into contact with said bead seats. When the beads make contact with the rim at said bead seats, air is introduced into the tire and by building up a sufficient pressure the beads are firmly seated in operative position shown in Figs. 1 and 3.

Referring now to Fig. 3, it will be seen that tire 10 is molded at its bead portion to substantially conform to the contour of the rim flanges 18 and 19 which it contacts in service. It is an important feature of the present invention that the sidewall 14 adjacent the rim flanges 18 and 19 is much thicker than is the case in conventional tires and that the sidewall extends beyond the radial outer and lateral marginal edge of said side flanges approximately 3/32″ so as to completely cover and extend beyond said flanges. The inside diameter of that portion of thickened sidewall between points a—b is approximately 3/32″ less than the outside diameter of the rim flange this portion of the thickened sidewall contacts in service. This results in a tight fit between the thickened sidewall portion and the rim flange as indicated in Fig. 3 where the edge 3 of the sidewall is shown as having a smaller diameter than the diameter of the edge of the rim flange adjacent thereto. It will be seen by reference to Fig. 4 wherein the tire bead is shown spaced laterally inwardly from the tire flange, as occurs in service when the tire 10 is subjected to a severe side thrust as explained hereinbefore, that the sidewall edge portion 3 remains in contact with said flange thereby preventing the entrance between the tire beads and the tire rim of small sticks of fibrous material or the like and also substantially preventing such entrance of silt or fine soil. It will also be seen that a gradual accumulation of silt or fine soil between the tire beads and the rim side flanges will enter recesses 30, 31 and 32 and will permit the rubber covering the lateral side of said beads to contact the metal of said flanges whereby the air seal between the tire and the rim is maintained until such accumulation of silt and fine soil becomes greater than the capacity of said recesses.

Ribs of rubber formed on the tire rim flange contact-side of tubeless tire beads have been known as air-sealing means as may be seen by reference to R. W. Brown, United States Patent Number 2,221,470. Such said ribs as have been used heretofore as air-sealing means for tubeless tires are not operative for the purpose of applicant's ribs 21, 21a, 21b and 21c. Applicant found that the thick rubber coating on the said rim flange contact-side of tire beads 12 and 13 was satisfactory air-sealing means at its rim flange contact. Applicant also found that the thickened sidewall portions 16 and 17 as described hereinabove were effective in preventing the entrance of sticks, fibers and coarse material between the tire beads and the rim flanges, but that in certain types of soil there was a gradual seepage of fine silt or dust between the tire beads and the rim flanges. The lodgment of such fine particles between the rubber and the flange prevented contact of the rubber with the flange and permitted a slow leak of inflationary air from the tire. The present invention provides recesses in the tire beads of such depth and width as to receive and retain the fine material that seeps between the tire beads and flange over a long period of tire service. Too great a depth of said recesses results in a soft rubber cushion between the rim flange and the tire beads which permits excessive action of the tire bead which action causes premature tire failures as will be understood by those familiar with the art. Applicant has discovered that for an 11.00-28 tire recess depths of .047″ are the greatest depths that can be used without such excessive action and that to provide the desired capacity of said recesses, substantially the relative width and spacing of the recesses shown in the drawings are necessary. Recesses 30 and 31 defined by ribs 21, 21a and 21b, 21c respectively are approximately as deep as they are wide and recess 32 defined by ribs 21a, 21b is approximately twice as wide as it is deep. This arrangement of and depth and width of said recesses just described has been found to be the most effective in trapping and retaining silt, dust and the like which may enter between the said beads and flanges while at the same time permitting continuous contact of the rubber composing said ribs with said flanges, while avoiding harmful action between the beads and the flanges.

The detailed description of the particular embodiment of the invention illustrated and described herein is not to be construed as limiting the invention thereto. The invention includes all features of patentable novelty residing in the foregoing description and the accompanying drawings.

What is claimed is:

1. In combination, a pneumatic agricultural tractor tire suitable for use without an inner tube and a tire rim having side flanges of standard contour, said tire comprising a body portion, tire bead portions and sidewalls, said sidewalls being composed of elastic rubber and having thickened portions molded to radially inner contours that approximately conform to the radially outer contours of said rim flanges and being in operative contact therewith when in use, the radially inner diameter of said thickened sidewall portions being approximately 3/32″ less than the radially outer diameter of the portions of the said flanges which said portions of the sidewall contact in service; the lateral outer edges of said thickened portions in their molded shape extending laterally outwardly approximately 3/32″ beyond the lateral outer edges of said flanges, whereby an air seal is made between said flanges and thickened sidewall portions and coarse foreign material is prevented from entering between said flanges and the tire beads, the lateral outer faces of said tire beads radially inward from said sidewalls having laterally outwardly opening fine soil receiving recesses formed therein, said recesses being defined by spaced concentric ribs molded on the tire beads and having a depth and width not greater than .047″ and .094″ respectively.

2. In combination, a pneumatic agricultural tractor tire of the character described and a tire rim having side flanges of standard contour, said tire comprising a reinforced body portion, tread, inextensible beads and sidewalls; said sidewalls including a protective layer of elastic rubber having thickened portions adapted to overlie and contact said flanges and being molded to provide radially inner contour surfaces that approximately conform to the radially outer contour of said flanges, said contour surfaces having a radially inner diameter substantially less than the radially outer diameter of the portion of the flange which the thickened portion contacts; the lateral outer edges of said thickened portions extending laterally outwardly beyond and having a molded diameter substantially less than the radially outer edges of said flanges, said laterally extended edges of the thickened portions being turned radially inwardly about the outer edges of the flanges by the inherent stresses in the thickened rubber portions due to the radially outer diameters of said flanges that contact said thickened rubber portions being greater than the radially inner diameter of said rubber portions they contact.

References Cited in the file of this patent

UNITED STATES PATENTS

| | | |
|---|---|---|
| 1,092,353 | Hallanan | Apr. 7, 1914 |
| 2,271,432 | Hull et al. | Jan. 27, 1942 |
| 2,424,918 | Brown | July 29, 1947 |
| 2,477,754 | Kraft | Aug. 2, 1949 |
| 2,479,810 | Bradley et al. | Aug. 23, 1949 |
| 2,703,517 | Hooper | Mar. 8, 1955 |

FOREIGN PATENTS

| | | |
|---|---|---|
| 209,440 | Great Britain | Jan. 11, 1924 |
| 329,955 | Great Britain | May 27, 1930 |
| 122,731 | Australia | July 22, 1944 |